US011047790B2

(12) United States Patent
Unlu et al.

(10) Patent No.: US 11,047,790 B2
(45) Date of Patent: Jun. 29, 2021

(54) METHOD AND SYSTEM FOR ENHANCED SINGLE PARTICLE REFLECTANCE IMAGING

(71) Applicant: TRUSTEES OF BOSTON UNIVERSITY, Boston, MA (US)

(72) Inventors: Selim M. Unlu, Jamaica Plain, MA (US); Oguzhan Avci, Boston, MA (US); Derin Sevenler, Brookline, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 56 days.

(21) Appl. No.: 16/300,356

(22) PCT Filed: May 9, 2017

(86) PCT No.: PCT/US2017/031723
§ 371 (c)(1),
(2) Date: Nov. 9, 2018

(87) PCT Pub. No.: WO2017/196823
PCT Pub. Date: Nov. 16, 2017

(65) Prior Publication Data
US 2019/0162647 A1    May 30, 2019

Related U.S. Application Data

(60) Provisional application No. 62/333,450, filed on May 9, 2016.

(51) Int. Cl.
| | |
|---|---|
| *G01B 11/02* | (2006.01) |
| *G01N 15/14* | (2006.01) |
| *G02B 21/14* | (2006.01) |
| *G02B 26/06* | (2006.01) |
| *H05H 3/02* | (2006.01) |

(Continued)

(52) U.S. Cl.
CPC ......... *G01N 15/1434* (2013.01); *G01B 11/02* (2013.01); *G01N 15/1429* (2013.01);
(Continued)

(58) Field of Classification Search
CPC .......... G01N 15/1434; G01N 15/1429; G01N 2015/1087; G01N 2015/1093;
(Continued)

(56) References Cited

U.S. PATENT DOCUMENTS

| | | |
|---|---|---|
| 4,094,947 A | 6/1978 | Alfrey, Jr. et al. |
| 4,886,353 A | 12/1989 | Fondeur |

(Continued)

OTHER PUBLICATIONS

Pixelated Phase-Mask Dynamic Interferometer, Millerd, Interferometry XII: Techniques and Analysis, edited by Katherine Creath, Joanna Schmit, Proceedings of SPIE vol. 5531 (SPIE, Bellingham, WA, 2004) (Year: 2004).*

(Continued)

*Primary Examiner* — Tarifur R Chowdhury
*Assistant Examiner* — Jonathon Cook
(74) *Attorney, Agent, or Firm* — Nixon Peabody LLP; Ronald I. Eisenstein; David F. Crosby

(57) ABSTRACT

An enhanced single particle interferometric reflectance imaging system includes an illumination source configured to produce illumination light along an illumination path toward a target substrate. The target substrate can be configured to reflect the illuminating light along one or more collection paths toward one or more imaging sensors. The target substrate includes a base substrate having a first reflecting surface and a transparent spacer layer having a first surface in contact with the first reflecting surface and a second reflecting surface on a side opposite to the first surface. The transparent spacer layer has a predefined thickness that is determined as a function of a wavelength of the (Continued)

illuminating light and produces a predefined radiation pattern of optical scattering when nanoparticles are positioned on or near the second reflective surface. In addition, one or more of the collection paths can also include an amplitude mask selected to match the radiation pattern.

18 Claims, 15 Drawing Sheets

(51) Int. Cl.
 *G02B 27/52* (2006.01)
 *G02B 21/08* (2006.01)
 *G02B 21/36* (2006.01)
(52) U.S. Cl.
 CPC .......... *G02B 21/082* (2013.01); *G02B 21/14* (2013.01); *G02B 21/361* (2013.01); *G02B 26/06* (2013.01); *G02B 27/52* (2013.01); *H05H 3/02* (2013.01); *G01N 2015/1493* (2013.01)
(58) Field of Classification Search
 CPC ....... G01N 2015/144; G01N 2015/145; G01N 2015/1454; G01N 2015/1493; G01N 2015/1497; G01B 11/02; G02B 21/082; G02B 21/14; G02B 21/361; G02B 26/06; G02B 27/52
 See application file for complete search history.

(56) References Cited

U.S. PATENT DOCUMENTS

| | | | |
|---|---|---|---|
| 5,260,964 A | 11/1993 | Morin et al. | |
| 5,592,292 A | 1/1997 | Legerton et al. | |
| 5,965,330 A | 10/1999 | Evans et al. | |
| 6,011,874 A * | 1/2000 | Gluckstad | G02B 27/52 359/559 |
| 9,791,684 B2 * | 10/2017 | Villiger | G01B 9/02002 |
| 2006/0285104 A1 * | 12/2006 | Walsh | G02B 21/14 356/39 |
| 2007/0030492 A1 | 2/2007 | Novotny et al. | |
| 2007/0086017 A1 | 4/2007 | Buckland et al. | |
| 2007/0280596 A1 | 12/2007 | Hou et al. | |
| 2008/0129981 A1 | 6/2008 | Nolte et al. | |
| 2008/0231862 A1 | 9/2008 | Haidner et al. | |
| 2010/0220312 A1 * | 9/2010 | Iwai | G01N 15/1434 356/39 |
| 2014/0104681 A1 | 4/2014 | Berman | |
| 2015/0042780 A1 * | 2/2015 | Palima | G02B 26/06 348/79 |
| 2016/0091797 A1 | 3/2016 | Ryzhikov | |

OTHER PUBLICATIONS

International Search Report for PCT/US2017/031723 dated Jul. 19, 2017.

* cited by examiner

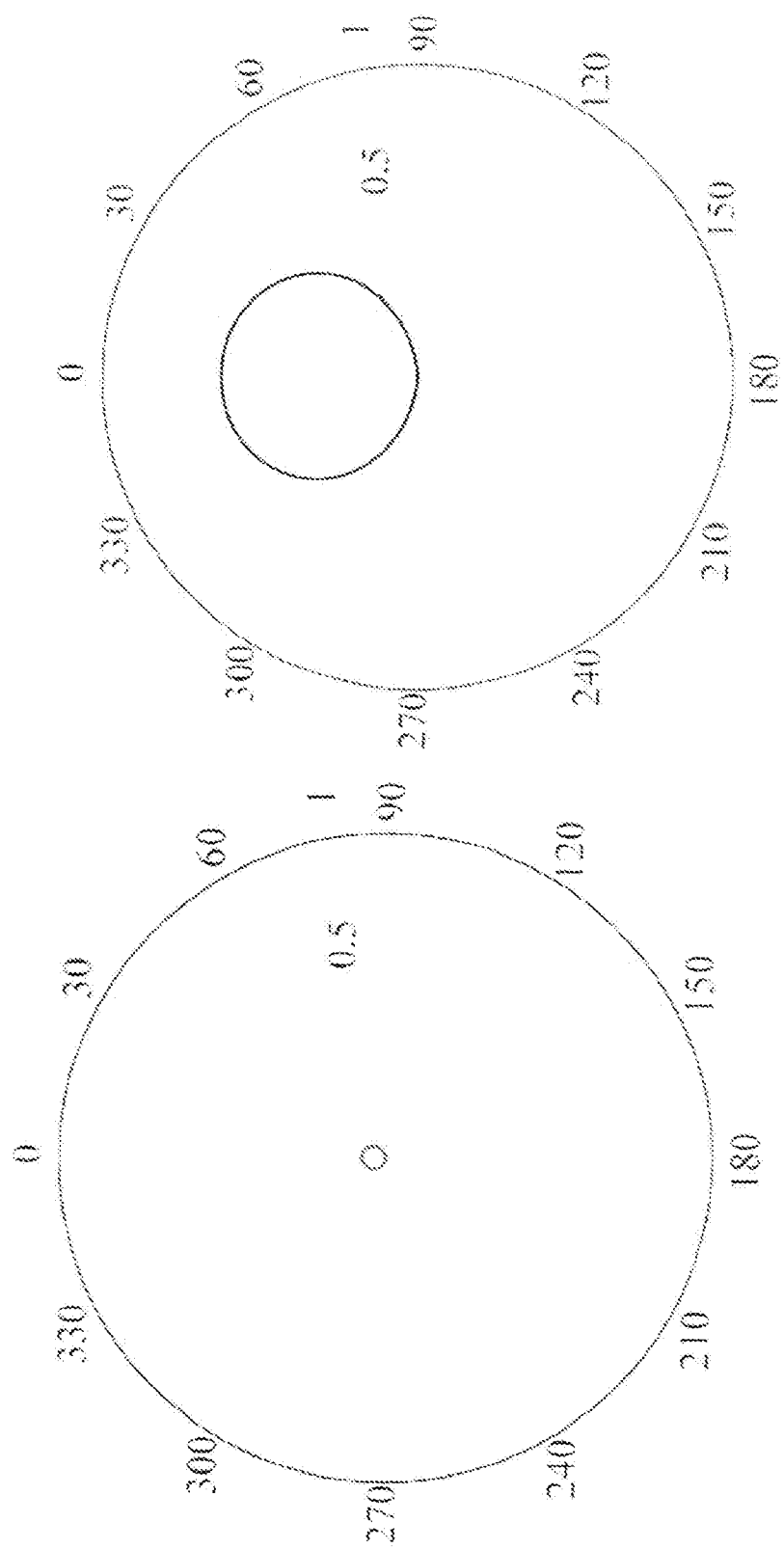

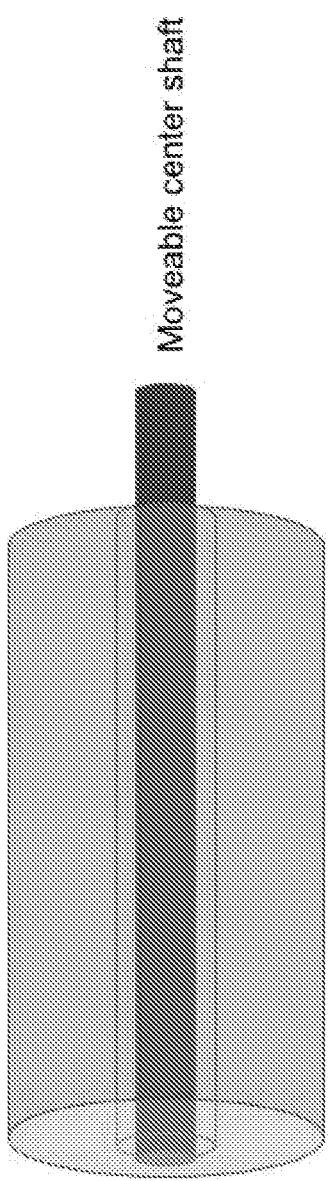
FIG. 13A
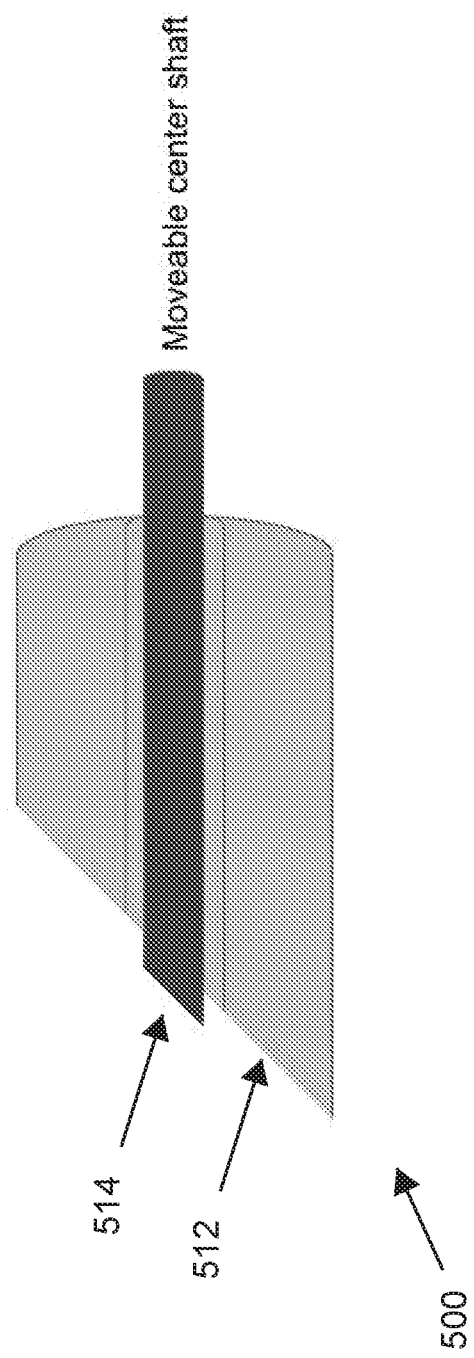
FIG. 13B
FIG. 13

METHOD AND SYSTEM FOR ENHANCED SINGLE PARTICLE REFLECTANCE IMAGING

CROSS-REFERENCE TO RELATED APPLICATIONS

This application is a 35 U.S.C. § 371 National Phase Entry Application of International Application No. PCT/US2017/031723 filed May 9, 2017, which designates the United States, and which claims benefit under 35 U.S.C. § 119(e) of U.S. Provisional Patent Application Ser. No. 62/333,450 filed May 9, 2016, the contents of which are incorporated herein in their entirety by reference.

STATEMENT REGARDING FEDERALLY SPONSORED RESEARCH

Not Applicable.

REFERENCE TO MICROFICHE APPENDIX

Not Applicable

BACKGROUND

Technical Field of the Invention

The present invention is directed to methods and systems for single particle reflectance imaging. More specifically, the invention is directed methods and systems for enhancing single particle detection using interferometric reflectance imaging sensors and systems.

Description of the Prior Art

Nanoscale particle and pathogen detection has become the cornerstone of diagnostics and disease screenings. The need for advanced diagnostic tools that detect and discriminate nanoparticles in a fast, cost-effective, and high-throughput fashion has been growing rapidly over the past decade. A lot of innovative imaging techniques have been developed over the years, yet those that offer highly sensitive imaging/detection capabilities suffer from expensive, complex set-ups, and meticulous sample preparations, while those that are cost-effective and practical, suffer from performance limitations.

SUMMARY

The present invention is directed to a Single Particle Interferometric Reflectance Imaging Sensor (SP-IRIS), which renders the detection of nanoscale particles ranging from low-index nanoparticles such as pathogens to metallic nanoparticles such as gold spheres and rods using a simple layered target reflective surface, and low cost optics.

The SP-IRIS system can be used to detect a target particle on or near a target surface of a target substrate, using interferometric reflectance imaging. The target substrate includes a spacer layer over a reflective substrate that produces an interference pattern based on the thickness of the spacer layer and the wavelength of the illuminating light. The particles at or near the surface of the spacer layer can be detected by detecting changes in the spectral reflectance and the interference patterns caused by the presence of the particles in the field of view. This is disclosed in commonly own International Application (designating the U.S.) nos. PCT/US2010/033397, PCT/US2014/062605 and PCT/US2015/019136, which are hereby incorporated by reference, in their entirety.

In accordance with some embodiments of the invention, the detection capabilities of SP-IRIS can be enhanced through co-optimization of target substrate and the implementation of pupil function engineering for apodization. The innovation can be used to detect low-index particles ranging from 250 nm down to 10 nm in diameter.

In accordance with some embodiments of the invention, the thickness of the spacer layer can be predefined and the collection path can be optimized using a collection mask (e.g., an amplitude or phase mask) which corresponds to a predetermined numerical aperture that would eliminate (e.g., mask) the specularly reflected light to enhance the signal produced by the presence of the detected particle. The collection mask can be arranged circularly symmetric around the optical axis and positioned in the Fourier plane along the collection path to filter some of the angular components of the reflected and scattered illumination light. In accordance with some embodiments of the invention, two or more illumination wavelengths can be used in a multiple collection path SP-IRIS system to increase the dynamic range in a multispectral SP-IRIS imaging system.

In some embodiments of the invention, the imaging system can integrate amplitude masks, designed for a radiation pattern of a dipole for a given sensor structure, in the illumination and the collection paths of the optical system. The reflected and scattered light components of the signal can therefore be tailored turning the system into a novel wide-field interferometric imaging system.

In accordance with some embodiments of the invention, the imaging system and method can provide sensitivity enhancement through co-optimization of sensor surface and apodization to enable the system and method to detect low-index nanoparticles (e.g., exosomes, virus particles, etc.) ranging between 10 to 250 nm in diameter. In accordance with some embodiments of the invention, the system and method can include multipath collection and multi-pupil function configurations to enable the system and method to discriminate nanoparticles from each other as well as from impurities in the background (dust particles, molecular aggregates, etc.) and to infer axial positions of the nanoparticles with regards to sensor surface.

In accordance with some embodiments of the invention, the imaging system and method can provide (e.g., a phase mask) for controlling the phase of the illuminating and reflected light by providing a filter with two or more concentric regions, wherein at least one of the regions can be configured to have a transmissivity or reflectivity that is greater or less than the other region, enabling the amplitude of the light along the collection path to be adjusted. For example, the central region along the optical axis can be configured to have a lower transmissivity to reduce the amplitude of reference illumination.

In accordance with some embodiments of the invention, the imaging system and method can provide (e.g., a phase mask) for controlling the phase of the illuminating and reflected light by defocusing (e.g., moving the objective along the optical path) and by providing a mirror with two or more concentric regions, wherein at least one of the regions can be configured to be moved axially respect to the other, enabling the phase of the light along the collection path to be adjusted. In addition, the movable region can have a different reflectivity (e.g., lower or higher) than some or all of the other regions of the mirror, enabling the system to control both the amplitude and the phase of the reference illumination.

These and other capabilities of the invention, along with the invention itself, will be more fully understood after a review of the following figures, detailed description, and claims.

BRIEF DESCRIPTION OF THE FIGURES

The accompanying drawings, which are incorporated into this specification, illustrate one or more exemplary embodiments of the inventions and, together with the detailed description, serve to explain the principles and applications of these inventions. The drawings and detailed description are illustrative, and are intended to facilitate an understanding of the inventions and their application without limiting the scope of the invention. The illustrative embodiments can be modified and adapted without departing from the spirit and scope of the inventions. The patent or application file contains at least one drawing executed in color. Copies of this patent or patent application publication with color drawings will be provided by the Office upon request and payment of the necessary fee.

FIG. 1B shows a dipole radiation diagram for a horizontally aligned dipole wherein the thickness of the transparent layer, d=10 nm and the illumination wavelength is 525 nm ($\lambda$=525 nm).

FIG. 1C shows a dipole radiation diagram for a horizontally aligned dipole wherein the thickness of the transparent layer, d=100 nm and the illumination wavelength is 525 nm ($\lambda$=525 nm).

FIG. 6A shows a diagrammatic view of a target wherein the particle is positioned at height h=0 and the thickness of the transparent layer, d=5/4$\lambda$. FIG. 6B shows a diagrammatic view of a target wherein the particle is positioned at height h=100 and the thickness of the transparent layer, d=5/4$\lambda$. FIG. 6C shows a dipole radiation diagram for a horizontally aligned dipole wherein height h=0. FIG. 6D shows a dipole radiation diagram for a horizontally aligned dipole wherein height h=100. FIG. 6E shows a collection mask for detecting a particle at height h=0. FIG. 6F shows a collection mask for detecting a particle at height h=0.

FIG. 13 shows a diagrammatic view of a method of making a concentric mirror according to some embodiments of the invention.

DETAILED DESCRIPTION OF PREFERRED EMBODIMENTS

The present invention is directed to a single particle interferometric reflectance imaging system and method. In accordance with some embodiments of the invention, the particle (or particles) to be detected can be mounted or otherwise positioned on a target substrate and illuminated using a known wavelength of illuminating light. An imaging system according to various embodiments of the present invention can detect the particle (or particles), their size and position with respect to the surface of the target substrate.

For purposes of illustration of the invention, nanoparticles can be considered as dipoles scattering the illuminating light. In accordance with some embodiments of the invention, the layered substrate used by SP-IRIS imaging system can be used enhance the forward scattering of the dipoles, increasing the overall visibility of the nanoparticles, as shown in FIGS. 1A-1C.

Figure 1A:
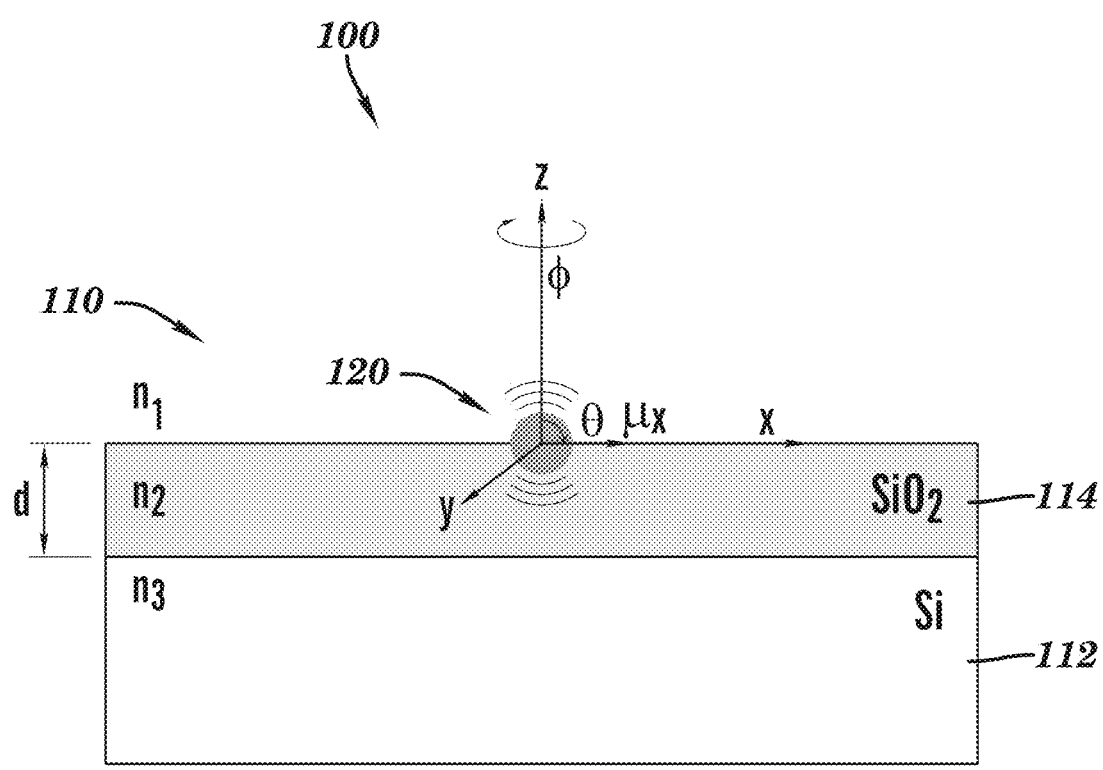
FIG. 1A is a block diagram of a target substrate having a dipole particle on a silicon base and a silicon oxide transparent layer according to some embodiments of the invention.

FIG. 1A shows a schematic diagram of a dipole positioned at height, h=0 of a SP-IRIS system target 100. The system target 100 includes a target substrate 110 and target particle 120 positioned with respect to the target surface 116. The substrate 110 include a base substrate 112 having a reflective surface 118 and a spacer layer 114 mount to the base substrate 112 over the reflective surface 118. FIG. 1A also shows a diagrammatic view of the radiation pattern produced by the illuminating light. By selecting the wavelength of the illuminating light and thickness, d, of the spacer layer, the illuminating light reflected by the reflecting surface 118 and illuminating light reflected by the target surface 116 can be induced to cause an interference pattern. That interference pattern can be disrupted by the presence of one or more dipoles positioned on or near the target surface. When the particle or dipole is horizontally aligned with axis of the imaging system, the dipole radiation pattern can be used to detect the presence of the dipole as well as detect its size and shape.

In accordance with some embodiments of the invention, the thickness, d, of the spacer layer 114 can be in the range from 10 nm to 2000 nm thick depending on the wavelength of radiation being used. In accordance with some embodiments, the thickness, d, of the spacer layer 114 can be in the range from 20 nm to 1000 nm thick. In accordance with some embodiments, the thickness, d, of the spacer layer need not be uniform over the entire extent of the target surface. For example, a portion of the target substrate can be configured to have one spacer layer 114 thickness, $d_1$, in one region and another spacer layer 114 thickness, $d_2$, in another region.

FIGS. 1B and 1C show dipole radiation diagrams for target 100 shown in FIG. 1A having different spacer layer 114 thicknesses, d. FIG. 1B shows the dipole radiation diagram for target 100 having a horizontally aligned dipole wherein the thickness, d=10 nm and illumination wavelength is 525 nm ($\lambda$=525 nm). FIG. 1C shows the dipole radiation diagram for target 100 having a horizontally aligned dipole wherein the thickness, d=100 nm and illumination wavelength is the same 525 nm ($\lambda$=525 nm). As can be seen from the figures, increasing the thickness of the oxide produces higher order radiation patterns. By matching these radiation patterns for a given oxide thickness and limiting the collection path to the angles with enhanced scattered fields, which substantially block the specularly reflected light, the overall visibility of the dipoles (e.g., nanoparticles) can be increased.

Figure 2:
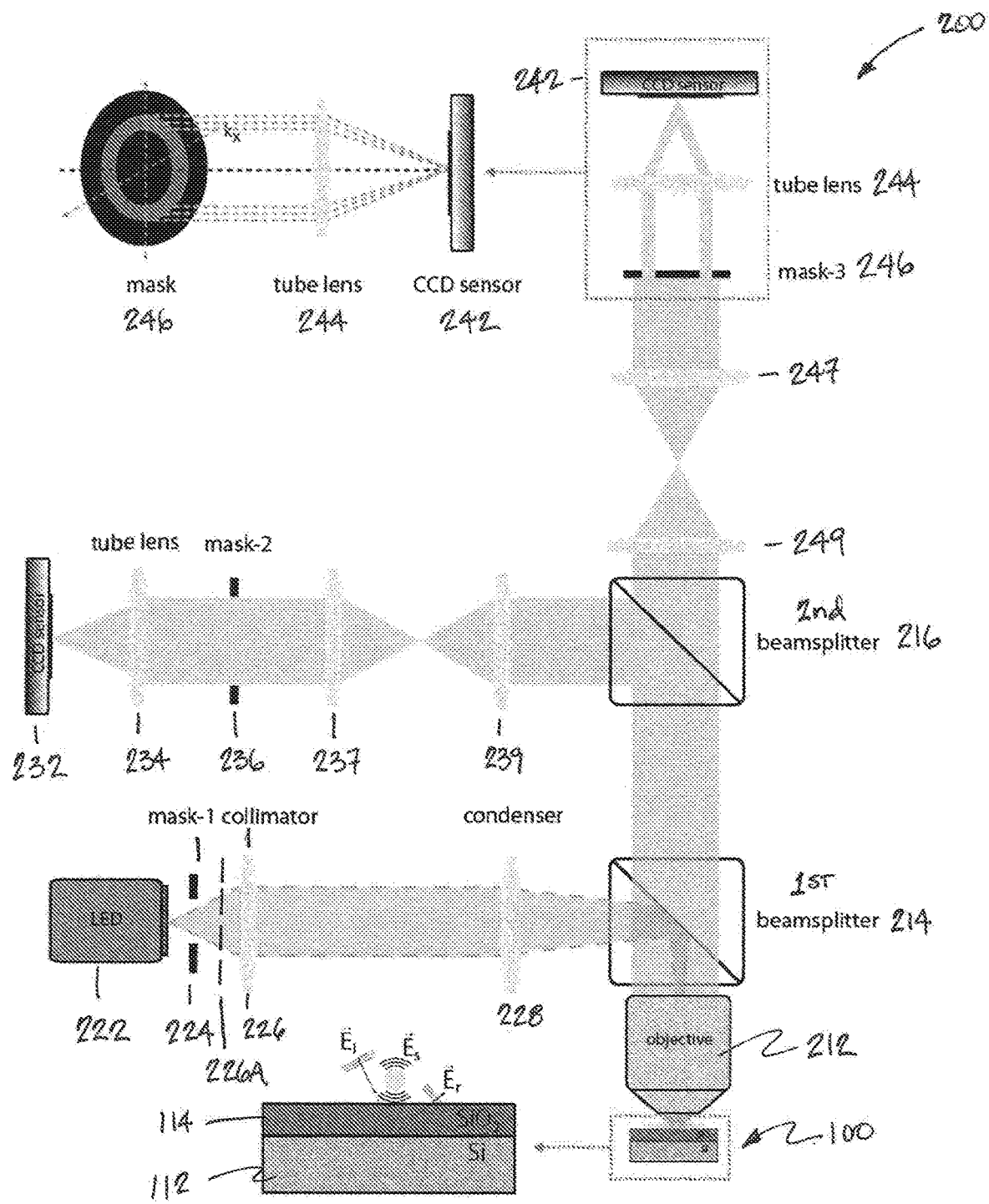
FIG. 2 is a diagrammatic view of an SP-IRIS imaging system according to some embodiments the invention.

FIG. 2 shows a diagrammatic view of an SP-IRIS imaging system 200 according to some embodiments of the invention. For purposes of illustration, the system 200 is shown having two collection paths, however as a person having ordinary skill would appreciate, the system 200 can be configured with one collection path or more than two collection paths, depending upon imaging requirements of the system. Similarly, a system having more than one collection path can be operated using the image data received from only one collection path or from less than all the collection paths.

In accordance with some embodiments of the invention, two collection paths can be provided to allow for the use of two separate collection mask configurations to be applied simultaneously, which can render nanoparticles with contrasting radiations (radiation with one main lobe vs. radiation with side lobes) visible with appropriate mask configurations. In accordance with some embodiments, each collection mask can be arranged circularly symmetrically around the optical axis and positioned in the Fourier plane along the collection path to filter certain angular components of the reflected and scattered illuminating light.

As shown in FIG. 2, SP-IRIS imaging system 200 according to some embodiments of the invention can include a target 100, an illumination source 222 producing one or more wavelengths of light along an illumination path toward the target 100 and one or more imaging sensors 232, 242, positioned along one or more collection paths to receive the reflected illumination light from the target 100.

The illumination source 222 can include one or more LED light sources producing illumination light in one or more predefined wavelengths of polarized or unpolarized light. The illumination path from the illumination source 222 can include one or more illumination masks 224, a collimating lens 226, and a condensing lens 228 to focus the illumination light through the objective lens 212 on to the target 100. Where polarized illumination is used a linear polarizer can be included between the collimating lens 226 and the illumination masks 224. A first beam splitter 214 can be provided to enable the reflected light traveling along the collection path to be transmitted to one or more imaging sensors. In accordance with the various embodiments of the invention, any wavelength in the infrared, visible or ultraviolet spectrum can be used. The specific wavelengths selected can determined and optimized based on the other components of the system, such as the size, shape and material components of the target particles to be detected, the target substrate 110, the spacer layer 114, the optical components, and the imaging sensors 232, 242. In accordance with some embodiments of the invention, the illumination wavelength can be any monochromatic wavelength, such as 525 nm. The illumination light source can include incoherent light (e.g., LED based light sources), coherent light (e.g., laser based light sources) or a combination of both. The illumination light source power can be in the range from 50 mW to 500 mW power. One advantage of using shorter wavelength illumination is the increased scalability of nanoparticle sensitivity.

Each collection path directs the light to an imaging sensor 232, 242 that measures the light intensity and wavelength over an array of sensors, such as a CCD or CMOS imaging array. The first collection path from the target 100 includes the objective lens 212, second beam splitter 216 which directs the reflected light toward the first imaging sensor 232, focusing lens 239, collimating lens 237, and tube lens 234 that focuses the collimated light into an image on the image sensor 232. The first collection mask 236 is positioned between the tube lenses 234 and the focusing lens 237 to control the angular content of the reflected light along the collection path. The numerical aperture of the first collection mask 236 can be selected based on the selected wavelength of the illumination light and the thickness of the spacer layer, d, to selectively allow for radiation from the dipole (or nanoparticle) to reach the image sensor 232 while substantially blocking the specularly reflected light, increasing the contrast of the image to increase the visibility of the dipole.

The second collection path from the target 100 includes the objective lens 212, second beam splitter 216 which allows the reflected light to be transmitted toward the second imaging sensor 242, focusing lens 249, collimating lens 247, and tube lens 244 that focuses the collimated light into an image on the image sensor 242. The second collection mask 246 is positioned between the tube lens 244 and collimating lens 247 to control the angular content of the reflected light along the collection path. As shown in the inset, the second collection mask 246 can include a pupil mask as well. The numerical aperture of the second collection mask 246 and the size of the pupil can be selected based on the selected wavelength of the illumination light and the thickness of the spacer layer to selectively allow for radiation from the dipole (or nanoparticle) to reach the image sensor 242 while substantially blocking the specularly reflected light, increasing the contrast of the image to increase the visibility of the dipole.

In accordance with some embodiments, each collection mask 236, 246, can be arranged circularly symmetrically around the optical axis and positioned in the Fourier plane along each collection path to filter certain angular components of the reflected and scattered illuminating light. This can be accomplished by placing a 4F system after the focal plane of the objective lens 212 in each of the collection paths.

In accordance with some embodiments of the invention, two (or more) collection paths allow for two (or more) separate collection mask configurations to be applied simultaneously, which can render nanoparticles with contrasting radiations (radiation with one main lobe vs radiation with side lobes) visible using predefined mask configurations. The use of two (or more) collection paths allow for simultaneous detection of nanoparticles at different heights as well as for the differentiation of particles based on size and type, since different size and type particles exhibit "signature" radiation patterns.

Figure 3:
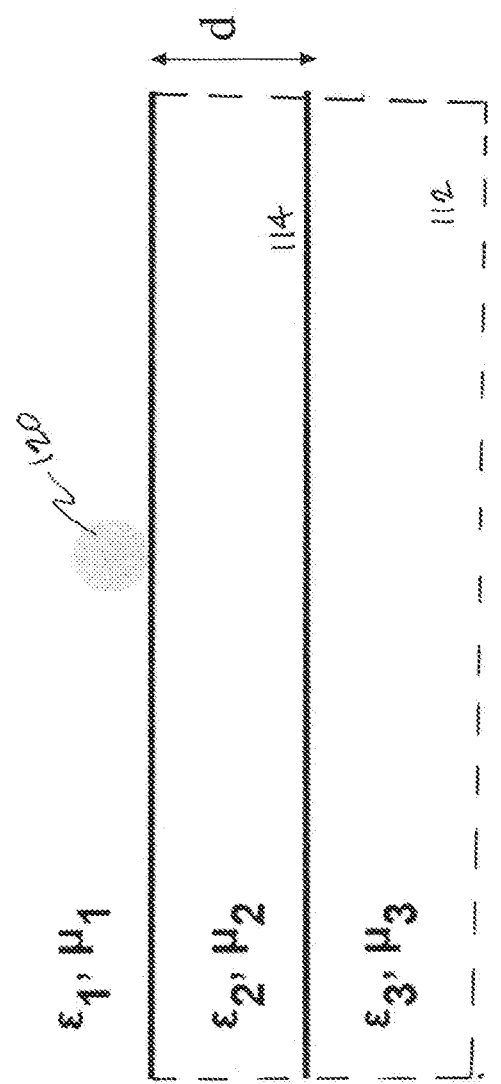
FIG. 3 is a diagrammatic view of the target substrate according to some embodiments of the invention.

In accordance with some embodiments of the invention and as shown in FIG. 3, the layered structure of the target substrate 110 can be used to enhance the forward scattering, and can be comprised of—but not limited to—$Si/SiO_2$. The spacer layer 114 can also include glass, polystyrene, silicon nitride, and other transparent and reflective materials. The target substrate 110 can include any semiconductor or dielectric material with a refractive index different than that of the spacer layer 114.

The spacer layer 114 and the base layer 112 of the target substrate in FIG. 3 are denoted with $\varepsilon_3$, $\mu_3$ and $\varepsilon_2$, $\mu_2$, respectively, where ε denotes the dielectric constant of the layer material and t denotes the relative permittivity of the layer material. The layer denoted with $\varepsilon_1$, $\mu_1$ indicates the surrounding medium, which can be air, water, or any type of buffer. The thickness of the middle or spacer layer, denoted with $\varepsilon_2$, $\mu_2$, and indicated by thickness, d, directly controls the amount of light scattering in the forward direction, and therefore controls the radiation patterns of the reflected and scattered light.

Figures 4A, 4B, 4C:
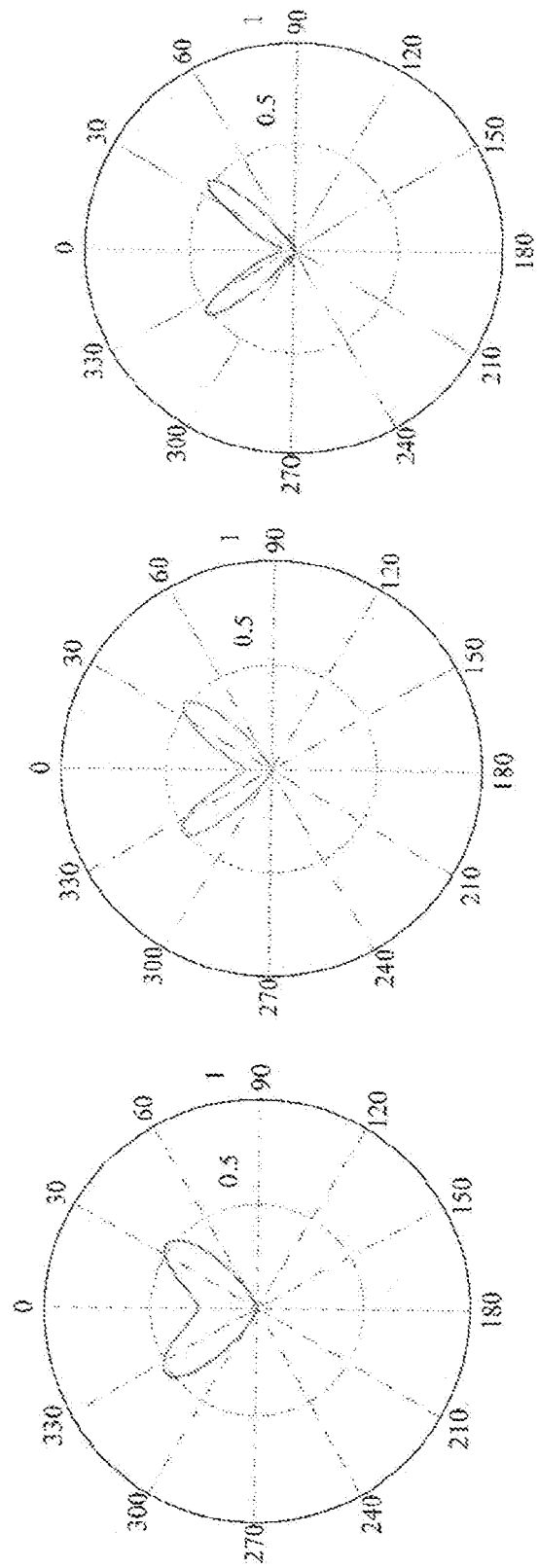
FIG. 4A shows a dipole radiation diagram for a horizontally aligned dipole wherein the thickness of the transparent layer, d=500 nm and the illumination wavelength is 525 nm ($\lambda$=525 nm).
FIG. 4B shows a dipole radiation diagram for a horizontally aligned dipole wherein the thickness of the transparent layer, d=700 nm and the illumination wavelength is 525 nm ($\lambda$=525 nm).
FIG. 4C shows a dipole radiation diagram for a horizontally aligned dipole wherein the thickness of the transparent layer, d=900 nm and the illumination wavelength is 525 nm ($\lambda$=525 nm).

In accordance with some embodiments of the invention, increasing the spacer layer thickness, d (for example, in the range from 20 nm to 1000 nm) cause higher order radiation patterns to emerge. This phenomenon is believed to be caused by the angle dependent change in phase between the primary scattered field components and reflected scattered field components as a result of the increase in thickness, d, of the spacer layer 114. This phenomenon is illustrated in FIGS. 4A, 4B and 4C which show the dipole radiation patterns for various spacer thicknesses using the same dipole position (h=0, resting on the target surface) and illumination wavelength (λ=525 nm). FIG. 4A shows the dipole radiation pattern for a horizontally aligned dipole on a Si/SiO target substrate where d=500 nm. FIG. 4B shows the dipole radiation pattern for a horizontally aligned dipole on the same Si/SiO target substrate where d=700 nm. FIG. 4CA shows the dipole radiation pattern for a horizontally aligned dipole on the same Si/SiO target substrate where d=900 nm.

In accordance with some embodiments of the invention, for an oxide thickness of 900 nm (e.g., FIG. 4C), using a collection mask in the range of 0.5 to 0.7 NA, which corresponds to an angular range of 30° to 45°, would significantly eliminate the specularly reflected light enhancing the contrast and the overall visibility of the dipole particle (resting on the target surface) in SP-IRIS signal. A different mask or an adjustable mask configuration can be used to selectively image dipole particles at various positions with respect to the target surface 116.

In accordance with some embodiments of the invention, a predefined set of collection masks can be selectively positioned (e.g., by a computer control system) to scan for dipoles/particles at different predefined positions and detect the position of the dipole/particle, based upon its image intensity. In accordance with some embodiments of the invention, an adjustable collection masks (e.g., an adjustable shutter) can be selectively controlled (e.g., by a computer control system) to change the numerical aperture to scan for dipoles/particles at different positions and detect the position of the dipole/particle, based upon its image intensity. In these embodiments, the numerical aperture that corresponds to the highest image intensity of the dipole/particle can be correlated to a known position of the dipole/particle with respect to the target surface 116.

Figure 5B:
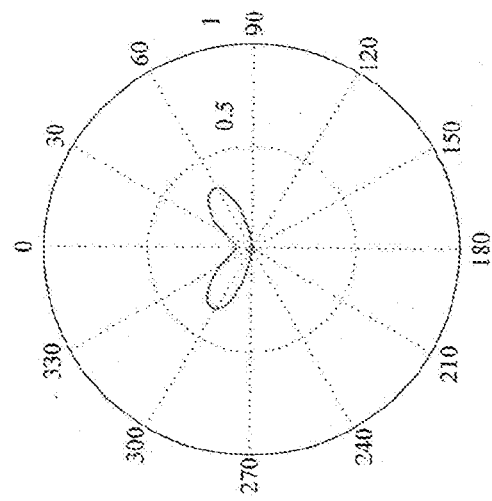
FIG. 5B shows a dipole radiation diagram for a horizontally aligned dipole wherein the thickness of the transparent layer, d=300 nm and the illumination wavelength is 660 nm ($\lambda$=660 nm, deep red).
Figure 5A:
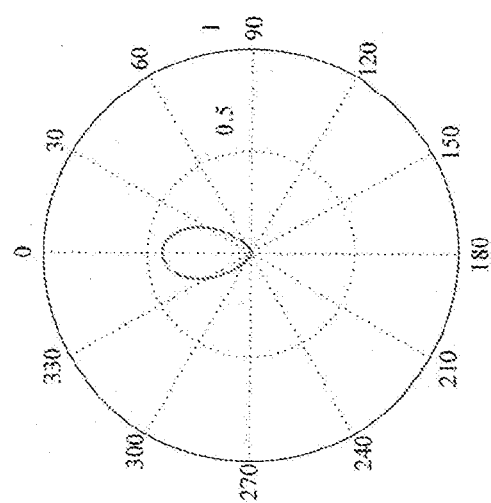
FIG. 5A shows a dipole radiation diagram for a horizontally aligned dipole wherein the thickness of the transparent layer, d=300 nm and the illumination wavelength is 450 nm ($\lambda$=450 nm, royal blue).

In accordance with some embodiments of the invention, the illumination wavelength can be used to increase the dynamic range of the imaging system. The illumination wavelength affects the radiation patterns of the nanoparticles, as it factors in the scattering cross-section, as well as in the phase due the spacer layer. FIGS. 5A and 5B show the effects of wavelength on the radiation patterns. FIG. 5A shows the dipole radiation pattern for a horizontally aligned dipole on a Si/SiO target substrate 110 having a spacer 114 thickness, d=330 nm using royal blue, 450 nm wavelength illumination. FIG. 5B shows the dipole radiation pattern for a horizontally aligned dipole on a Si/SiO target substrate 110 having a spacer 114 thickness, d=330 nm, using deep red, 660 nm wavelength illumination. As can be seen from FIGS. 5A and 5B, the radiation patterns differ from one another significantly, where a low angular collection mask would reject most of the scattered light in the case of the illumination with royal blue light, decreasing the nanoparticle signal, whereas the same mask would be suitable for the radiation pattern due to illumination with deep red light. This feature enables the embodiments of the invention having two or more collection paths to increase the dynamic range of nanoparticle detection for multispectral imaging.

In accordance with some embodiments of the invention, the SP-IRIS imaging system can be used to image nanoparticles at various heights with respect to the target surface 114 by configuring the SP-IRIS system to detect different radiation patterns using different masks and wavelengths of illumination to image nanoparticles at various heights with respect to the target surface and infer the height information as well as to enhance their visibility in highly scattering media. Imaging nanoparticles in real time can be challenging in-liquid experiments, because particle visibility changes substantially as the particles make axial and lateral movements as a result of Brownian motion in the microfluidic channels. The axial movements of the nanoparticles simply translate into height changes of dipoles near a layered sensor structure, which can be detected by SP-IRIS imaging system according to the various embodiments of the invention.

Figure 6A:
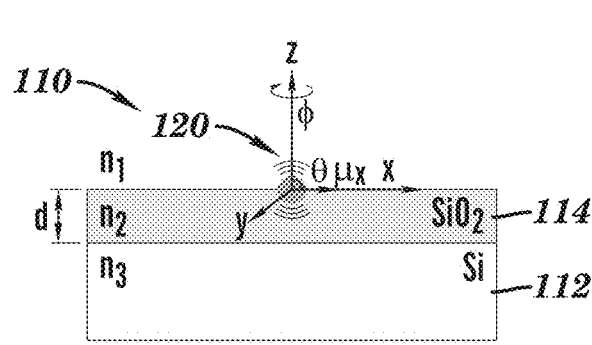
FIGS. 6A-6F show a diagrammatic view of a particle positioned at two different heights (e.g., 0 and 100 nm), the corresponding dipole radiation diagram and the corresponding collection mask for optimized imaging at each height.
Figure 6B:
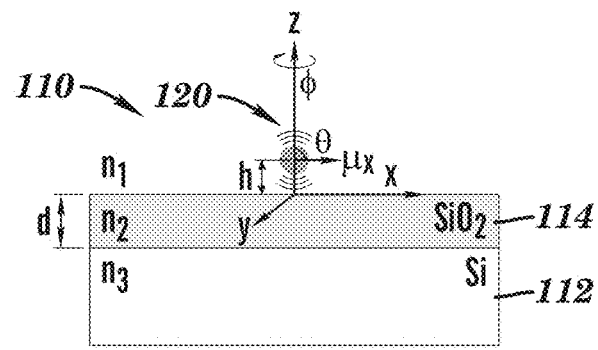
Figure 6C:
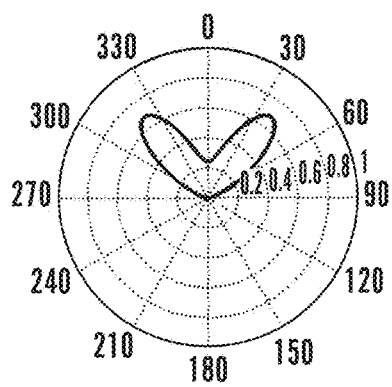
Figure 6D:
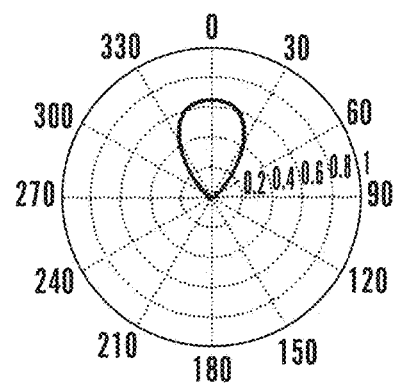
Figure 6E:
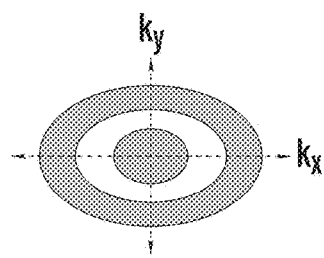
Figure 6F:
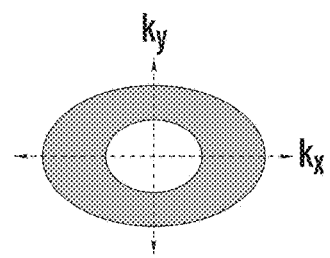

FIGS. 6A-6F show how a system according to some embodiments of the invention can be used to detect dipoles at different heights using different collection mask configurations. FIG. 6A shows a horizontally aligned dipole at height, h=0 nm on a target substrate having a spacer thickness d=5/4λ and FIG. 6B shows a horizontally aligned dipole at height, h=100 nm above the same target substrate having a spacer thickness d=5/4λ. FIG. 6C shows the radiation pattern for the horizontally aligned dipole at height, h=0 nm on the target substrate and FIG. 6D shows the radiation pattern for the horizontally aligned dipole at height, h=100 nm above the same target substrate. By using a collection mask that blocks the spectrally reflected light at a predefined dipole height, the collection path can be tuned to detect a dipole at predefined height. FIG. 6E shows the corresponding collection mask for detecting the dipole positioned at h=0 nm and FIG. 6F shows the corresponding collection mask for detecting the dipole positioned at h=100 nm. Using these different collection masks, the SP-IRIS imaging system can be used to image dipoles at two different heights with respect to the target surface.

In accordance with some embodiments of the invention, the system can be calibrated by positioning dipoles/particles at predefined heights, h, with respect to the target surface and adjusting the numerical aperture and pupil size of the mask to optimize the imaging system to particles at predefined locations.

Within the paraxial approximation limit, we can relate the NA of a mask that can have an adjustable aperture, such as an iris, with the size of its diameter as follows:

$$\frac{D_{aperture}}{D_{objective}} = \frac{\theta_{mask,max}}{\theta_{obj,max}}$$

where $D_{aperture}$ is the diameter of the mask, $D_{objective}$ is the diameter of the back focal plane of the objective, $\theta_{obj,max}$ is the maximum angle allowed by the objective, and the $\theta_{mask}$, the angles allowed by the mask: $0 \leq \theta_{mask} \leq \theta_{mask,mask}$. Note that the allowed angle ranges for masks, where high only angles are allowed (by having a field stop in the center), can also be determined using the same approach. The mask optimization can be used to enhance the visibility of nanoparticles according to their radiation patterns, not necessarily to discriminate them based on their sizes. This enhancement will allow for visualization and characterization of small nanoparticles that are otherwise not visible due to the noise background under conventional SP-IRIS. The interferometric image recorded by a 2D CCD or CMOS imaging sensor reveals nanoparticles in diffraction limited spots as bright dots in the digitized image, which can then be easily detected and its signal can be quantified by normalizing the peak response with respect to the surrounding background signal.

In accordance with some embodiments of the invention, the SP-IRIS imaging system can include a wide-field common-path interferometric microscopy technique that uses a partially-coherent LED. The common-path modality provides simplicity in the overall system eliminating the need for a separate arm for reference light. This, however, comes at the expense that the path length (i.e., phase) of the reflected field cannot be adjusted independently from that of the scattered fields due to the use of the same optical path.

Figures 10A, 10B:
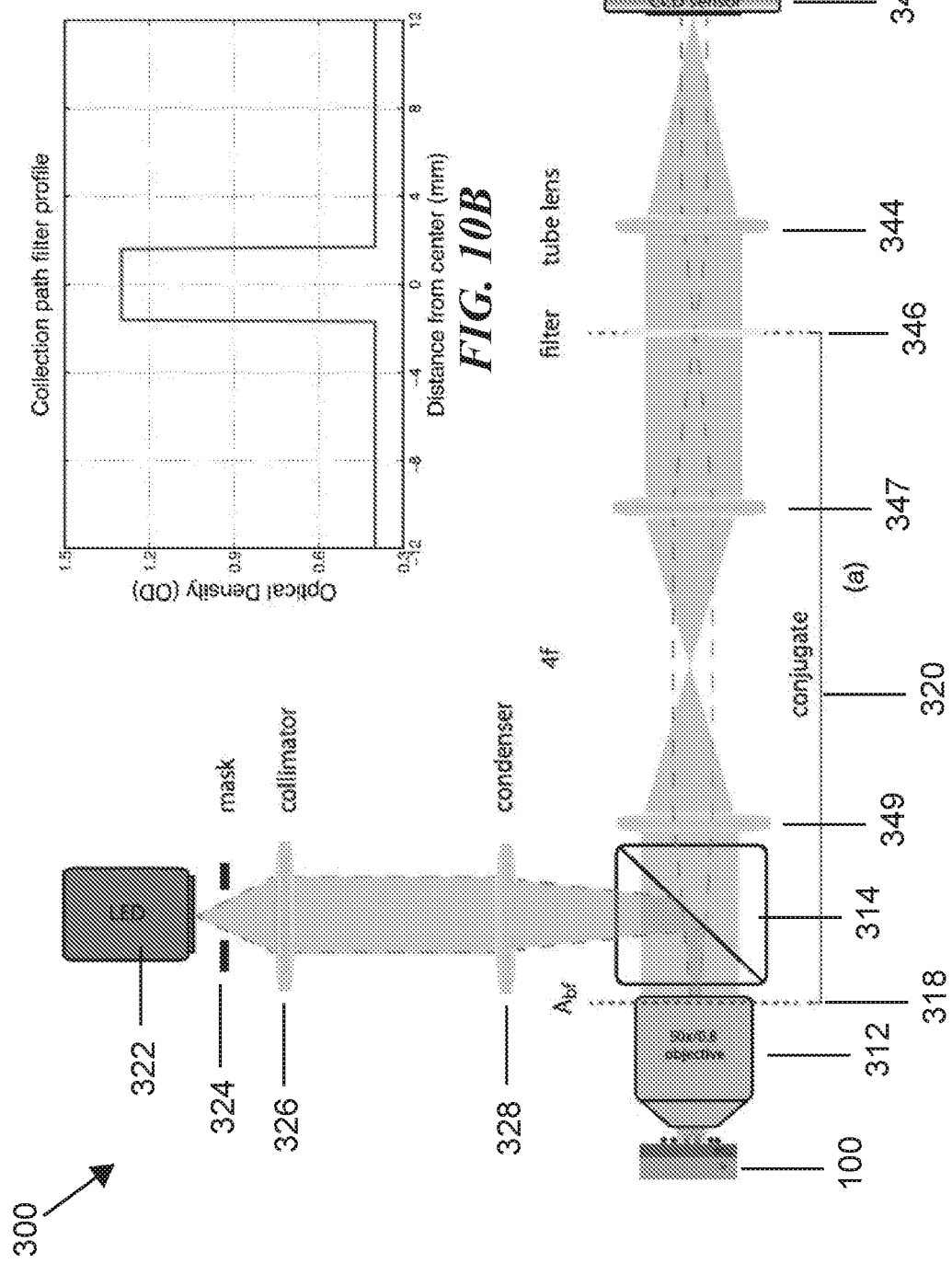
FIG. 10A shows a diagrammatic view of a wide-field Interferometric Microscopy setup (e.g., an SP-IRIS imaging system) demonstrating masks in both the illumination path and the collection path. The 4f system in the collection path relays the back focal plane of the objective to a conjugate plane where the filter is placed.
FIG. 10B shows a diagram of the transmission profile of the filter shown in FIG. 10A.

However, the phase angle between the two fields at the image plane is a function of the focus position of the microscope objective, provided that the illumination is limited to normal-incidence rays by sufficiently under-filling the back aperture of the objective (e.g., see FIG. 10A). Since the scattered and reflected fields can have substantially different propagation vectors, changing the focus position of the objective with respect to the target substrate (as illustrated in FIGS. 7A and 7B, and FIG. 8) alters their relative phase resulting in a focus dependent signal due to the interference term.

Figure 7A:
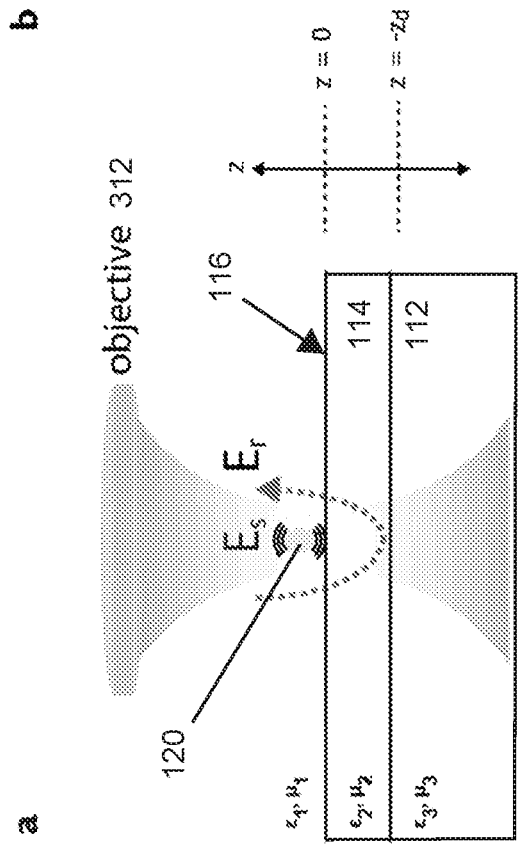
FIGS. 7A and 7B show diagrammatic views of the target substrate positioned at different locations relative to the focal plane of the objective lens according to some embodiments of the invention.
Figure 7B:
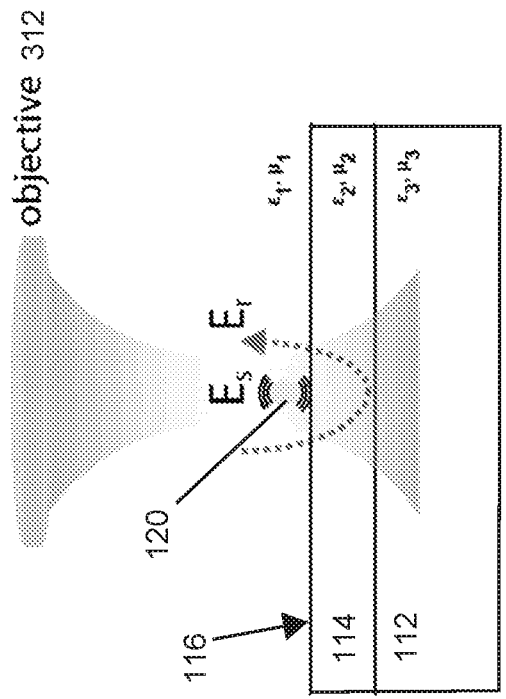

FIG. 7A shows a diagrammatic view of the objective lens 312 and the focal plane of the objective lens, z=0, and where the top surface 116 of the target substrate is positioned along the focal plane of the objective lens (and the spacer layer 114 and the base layer 112 are positioned below). FIG. 8 shows, in the middle column, the resulting image that can be produced by an SP-IRIS imaging system such as that shown in FIGS. 2 and 10 for 70 nm, 100 nm and 150 nm polystyrene nanospheres. FIG. 7B shows a diagrammatic view of the objective lens 312 and the focal plane of the objective lens, z=–zd, and where the top surface 116 of the target substrate is positioned a distance zd below the focal plane of the objective lens (and the spacer layer 114 and the base layer 112 are positioned below). FIG. 8 shows, in the left column, the resulting image that can be produced by an SP-IRIS imaging system such as that shown in FIGS. 2 and 10 for 70 nm, 100 nm and 150 nm polystyrene nanospheres in a defocus position (e.g., –0.5 µm) below the focal plane of the objective lens and in the right column, the resulting image that can be produced by an SP-IRIS imaging system such as that shown in FIGS. 2 and 10 for 70 nm, 100 nm and 150 nm polystyrene nanospheres in a defocus position (e.g., 0.5 µm) above the focal plane of the objective lens 312.

Figure 8:
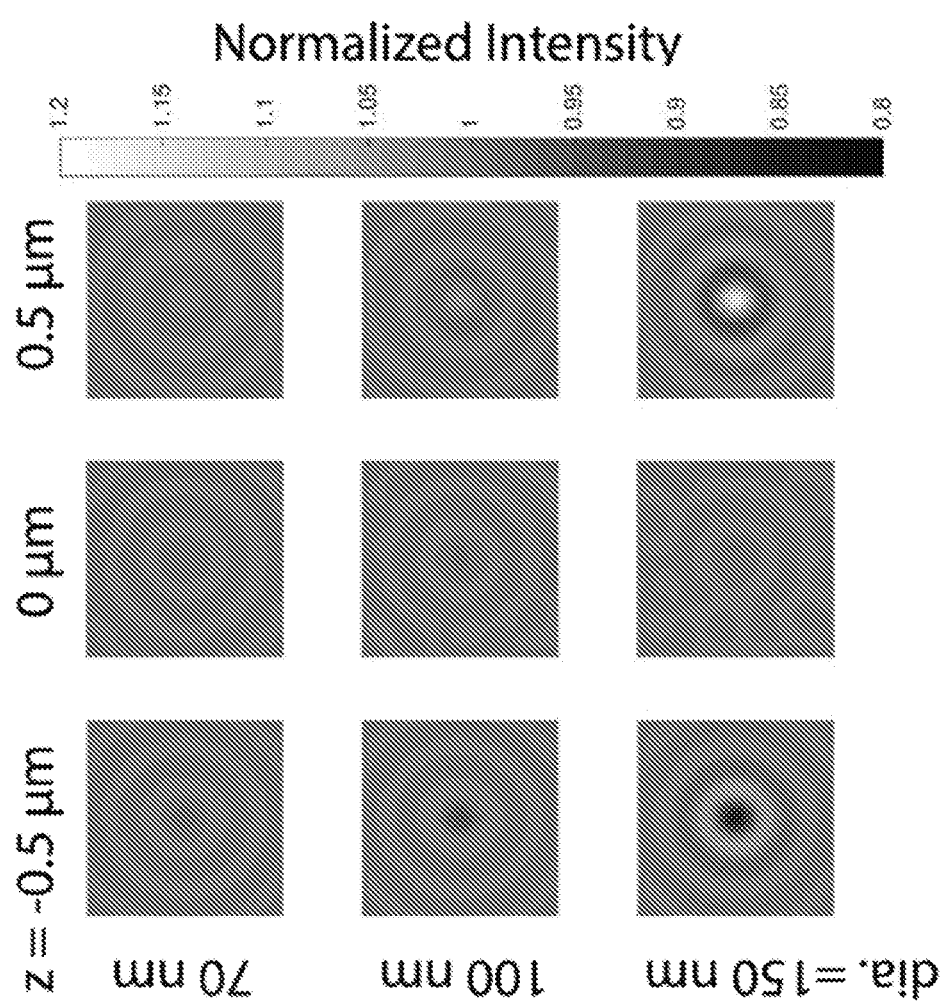
FIG. 8 shows simulated images of a 70 nm (top), a 100 nm (middle) and a 150 nm (bottom) diameter polystyrene (n=1.60) nanoparticle resting on a 30 nm SiO2 IRIS substrate, at three different focus positions (z=−0.5 µm, 0 µm, 0.5 µm) with respect to the water-film interface (NA=0.9, water immersion, $\lambda$=525 nm) according to some embodiments of the invention.
Figure 9:
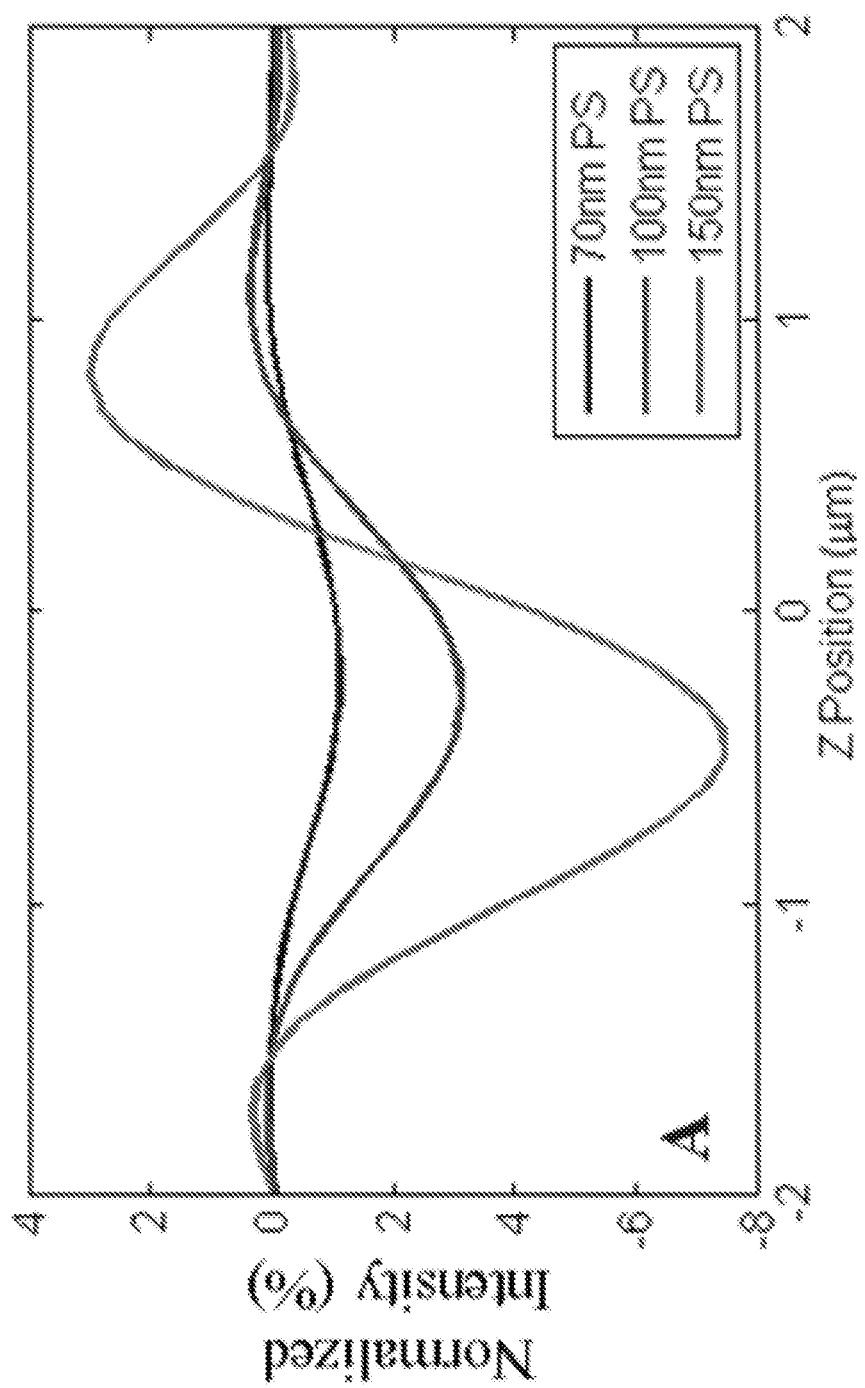
FIG. 9 shows a diagram of normalized intensity of a center pixel for the three sizes of polystyrene nanospheres (from FIG. 8) bound to a 30 nm oxide on silicon substrate, showing changes in appearance and defocus behavior due to variation in z-axis position of the radiating dipole (e.g., the polystyrene nanosphere) with respect to the reference field generated by the reflective surface of the substrate.

Therefore, when the target substrate is moved axially, the brightness of the nanoparticle in the image can vary significantly as illustrated in the simulated images shown in FIG. 8. FIG. 9 shows a graph of the normalized intensity of the center pixels of SP-IRIS images of the 70 nm, 100 nm and 150 nm polystyrene nanospheres over a range of defocus positions with respect to the focal plane of the objective lens. As illustrated in FIG. 9, the peak brightness (normalized intensity of center pixel in the image) varies with the defocus similar to what would be expected from a conventional interferometric measurement with two separate optical paths for signal and reference. Thus, defocusing provides a mechanism to sweep the phase of the reference signal with respect the scattered light signal.

In accordance with some embodiments of the SP-IRIS imaging system 300 according to the invention, the nanoparticle signal can be enhanced by reducing the background signal, which essentially involves reducing the amplitude of the reference field components. In accordance with some embodiments of the invention, this can be achieved by Fourier filtering using an amplitude mask in the collection path. To do so, a 4f system 320 can be used to relay the back focal plane 318 of the objective 312 to a conjugate plane where an amplitude mask 346 can be placed as shown in FIG. 10A. This can allow for excitation of nanoparticles with high power illumination without saturating the detector with high background signal. In turn, the interferometric signal such as for weakly scattering nanoparticles can be enhanced, if the low-NA illumination is used and a spatial transmission filter 346 in the Fourier plane of the collection arm covers the whole angular spectrum of the illumination rays, reducing their specularly reflected fields' amplitudes (i.e., reference field components). In this embodiment, all the reference field components experience this reduction, however only a part of the scattered field components (low-angle scattered rays) will go through an amplitude reduction, allowing for a potential enhancement in the overall signal.

FIG. 10A shows an SP-IRIS imaging system 300 according to some embodiments of the invention. The SP-IRIS imaging system 300 according to some embodiments of the invention can include a target 100, an illumination source 322 producing one or more wavelengths of light along an illumination path toward the target 100 and one or more imaging sensors 242, positioned along one or more collection paths to receive the reflected illumination light from the target 100.

The illumination source 322 can include one or more LED light sources producing illumination light in one or more predefined wavelengths of polarized or unpolarized light. The illumination path from the illumination source 322 can include one or more illumination masks 324, a collimating lens 326, and a condensing lens 328 to focus the illumination light through the objective lens 312 on to the target 100. Where polarized illumination is used a linear polarizer can be included between the collimating lens 326 and the illumination masks 324. A first beam splitter 314 can be provided to enable the reflected light traveling along the collection path to be transmitted to one or more imaging sensors. In accordance with the various embodiments of the invention, any wavelength in the infrared, visible or ultraviolet spectrum can be used. The specific wavelengths selected can determined and optimized based on the other components of the system, such as the size, shape and material components of the target particles to be detected, the target substrate 110, the spacer layer 114, the optical components, and the imaging sensors 242. In accordance with some embodiments of the invention, the illumination wavelength can be any monochromatic wavelength, such as 525 nm. The illumination light source can include incoherent light (e.g., LED based light sources), coherent light (e.g., laser based light sources) or a combination of both. The illumination light source power can be in the range from 50 mW to 500 mW power. One advantage of using shorter wavelength illumination is the increased scalability of nanoparticle sensitivity.

Each collection path directs the light to an imaging sensor 242 that measures the light intensity and wavelength over an array of sensors, such as a CCD or CMOS array. The first collection path from the target 100 includes the objective lens 312, second beam splitter 314 which allows the reflected light to be transmitted toward the imaging sensor 342, focusing lens 349, collimating lens 347, and tube lens 344 that focuses the collimated light into an image on the image sensor 342. The collection path filter 346 is positioned between the tube lens 344 and collimating lens 347 to control the angular content of the reflected light along the collection path. As shown in FIG. 10B, the filter 246 can include a center portion that provides a low transmission rate as compared to the remaining our portion of the filter (e.g., similar to a pupil mask). The diameter of the central portion of the filter can be selected based on the numerical aperture of the objective and magnification of the 4f system 320, as well as the selected wavelength of the illumination light and the thickness of the spacer layer to selectively allow for radiation from the dipole (or nanoparticle) to reach the image sensor 342 while substantially blocking the specularly reflected light, increasing the contrast of the image to increase the visibility of the dipole.

As seen in the exemplary filter profile shown in FIG. 10B, the center of the filter (with radius of 1.6 mm) has a transmission rate of 0.05, and the transmission rate on the rest of the filter on glass is 0.4. In the Kohler illumination scheme, as the light source is imaged on the back focal plane of the objective and that same plane is relayed to the filter plane, this filter 346 configuration effectively reduces the reference intensity by around 95%. The scattered field, on the other hand, is in Fourier plane in the back focal aperture of the objective, hence also in the plane where the filter 346 lies, and it encompasses a region of 6.4 mm in diameter on the filter 346. This area is essentially determined by the NA of the objective 312 and the magnification of the 4f system 320. The high spatial frequency components of the scattered field (>0.4 NA) do not encounter the lossy part (e.g., the low transmission rate and intensity reducing part) of the filter 346, enabling partial signal adjustment between the reference field and part of the scattered field. Therefore, the scattered field, especially the higher spatial frequency components encounters a transmission rate that is a lot higher than what the reference field encounters, allowing for the interferometric signal constituents to be more comparable to one another, amplitude wise.

Figure 11:
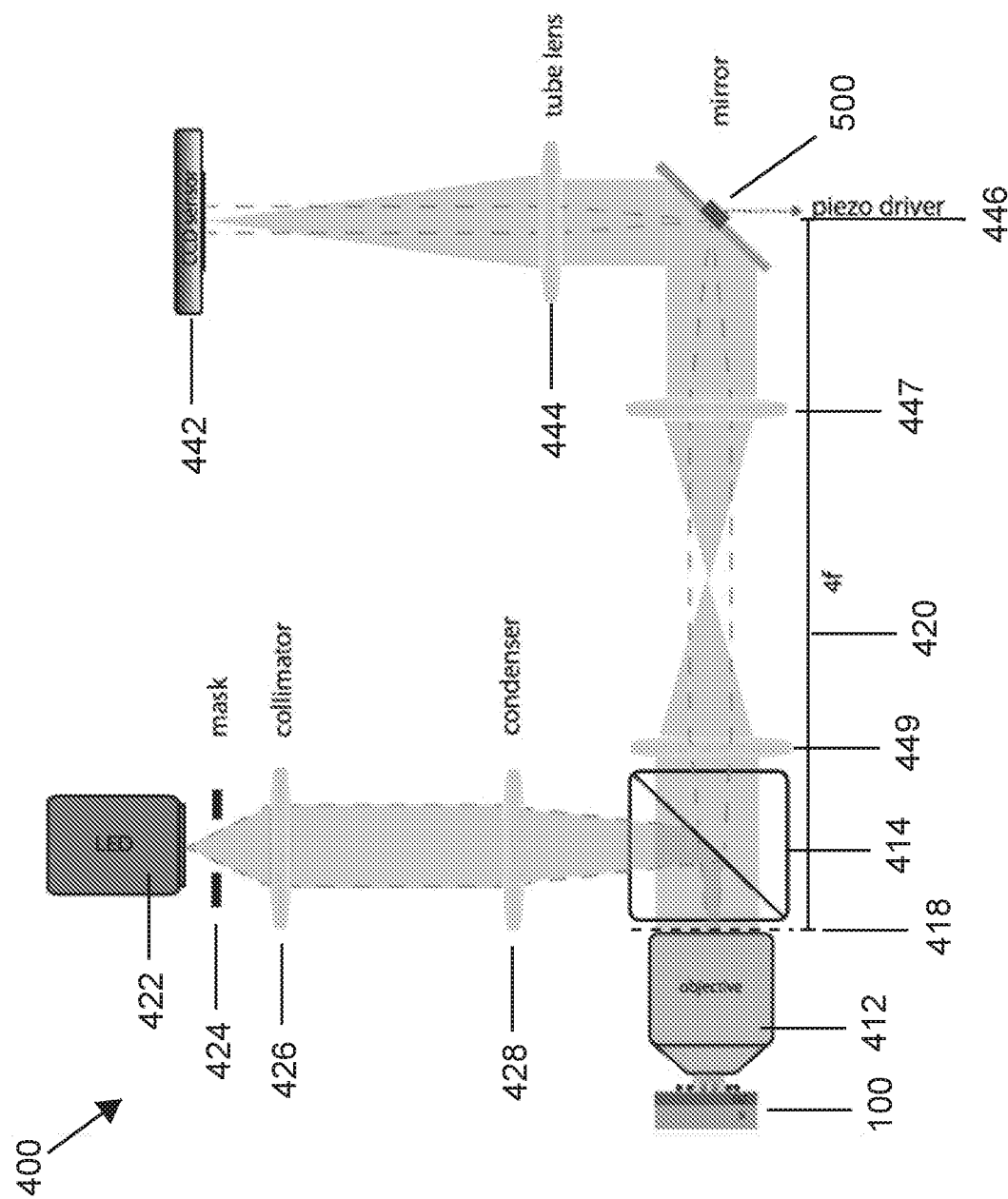
FIG. 11 shows a diagrammatic view of an SP-IRIS imaging system incorporating a concentric mirror according to some embodiments the invention.

FIG. 11 shows an SP-IRIS system 400 according to some embodiments of the invention that enables more independent control over the phase between the scattered and reference light through a 4f system 420 and a mirror 500 with two concentric regions, without the need for changing the focus position of the objective 412 relative the target substrate 100 as shown in FIG. 10A. The mirror 500 can be placed at the conjugate plane 446 where the reference and scattered fields are spatially separated—with reference field imaged in the center. A piezo-driven central part of the mirror provides independent control of the phase (e.g., a phase mask) between the scattered and reference light, without the need for moving the objective lens 412 in the z-direction. Furthermore, the amplitude of the reference field can also be reduced simultaneously by adjusting the reflectivity of this moving part of the mirror, proving means to control both amplitude and the phase of the reference field with regards to the scattered light.

As shown in FIG. 11, the SP-IRIS imaging system 400 according to some embodiments of the invention can include a target 100, an illumination source 422 producing one or more wavelengths of light along an illumination path toward the target 100 and one or more imaging sensors 442, positioned along one or more collection paths to receive the reflected illumination light from the target 100.

The illumination source 422 can include one or more LED light sources producing illumination light in one or more predefined wavelengths of polarized or unpolarized light. The illumination path from the illumination source 422 can include one or more illumination masks 424, a collimating lens 426, and a condensing lens 428 to focus the illumination light through the objective lens 412 on to the target 100. Where polarized illumination is used a linear polarizer can be included between the collimating lens 426 and the illumination masks 424. A first beam splitter 414 can be provided to enable the reflected light traveling along the collection path to be transmitted to one or more imaging sensors 442. In accordance with the various embodiments of the invention, any wavelength in the infrared, visible or ultraviolet spectrum can be used. The specific wavelengths selected can determined and optimized based on the other components of the system, such as the size, shape and material components of the target particles to be detected, the target substrate 110, the spacer layer 114, the optical components, and the imaging sensors 442. In accordance with some embodiments of the invention, the illumination wavelength can be any monochromatic wavelength, such as 525 nm. The illumination light source can include incoherent light (e.g., LED based light sources), coherent light (e.g., laser based light sources) or a combination of both. The illumination light source power can be in the range from 50 mW to 500 mW power. One advantage of using shorter wavelength illumination is the increased scalability of nanoparticle sensitivity.

Each collection path directs the light to an imaging sensor 442 that measures the light intensity and wavelength over an array of sensors, such as a CCD or CMOS array. The first collection path from the target 100 includes the objective lens 412, second beam splitter 414 which allows the reflected light to be transmitted toward the imaging sensor 442, focusing lens 449, collimating lens 447, concentric mirror 500, and tube lens 444 that focuses the collimated light into an image on the image sensor 442. The concentric mirror 500 is positioned between the tube lens 444 and collimating lens 447 (e.g., at the conjugate plane 446) to control the angular content of the reflected light along the collection path. The 4f system 420 in the collection path relays the back focal plane 418 of the objective 412 to a conjugate plane 446 where the concentric mirror 500 is placed at 45 degrees to the optical axis.

Figure 12:
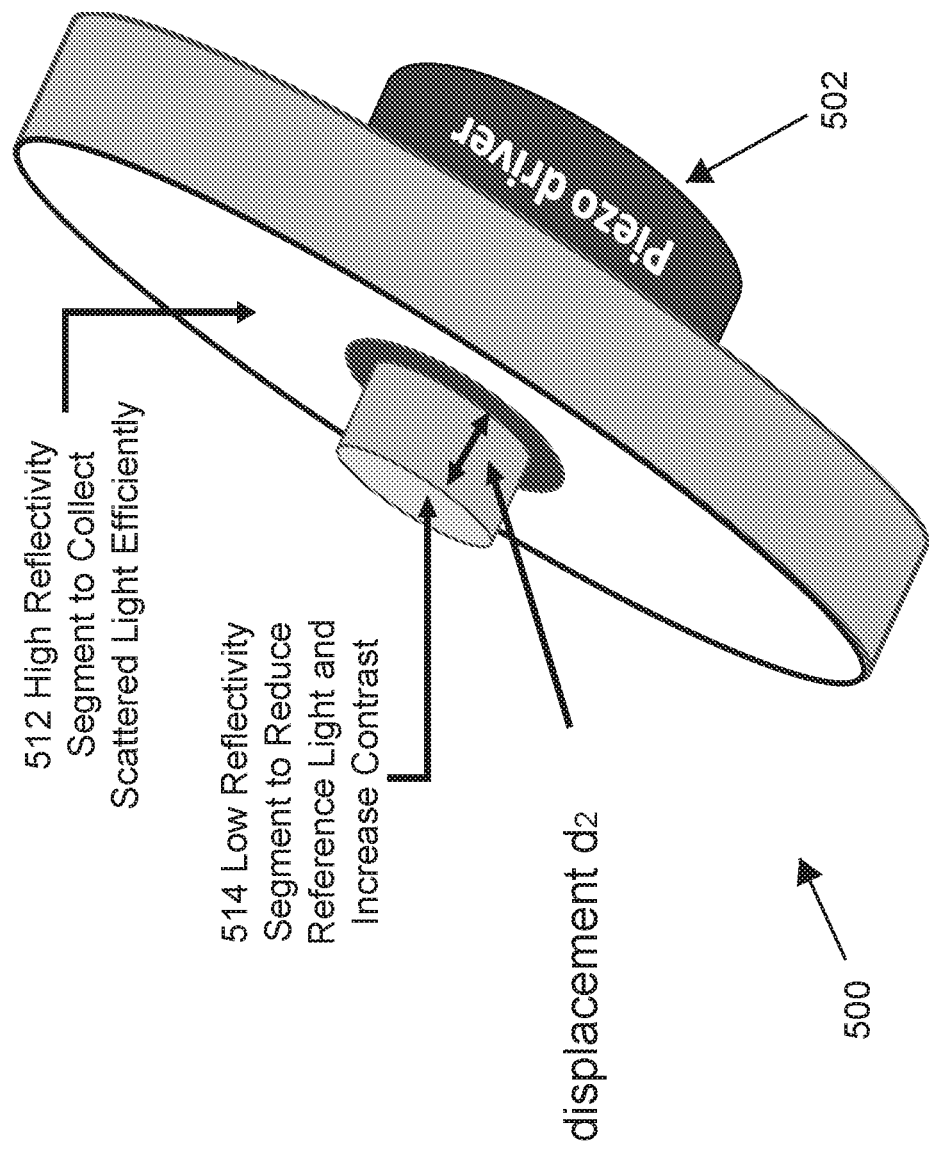
FIG. 12 shows a diagrammatic view of a concentric mirror according to some embodiments of the invention.
Figure 14:
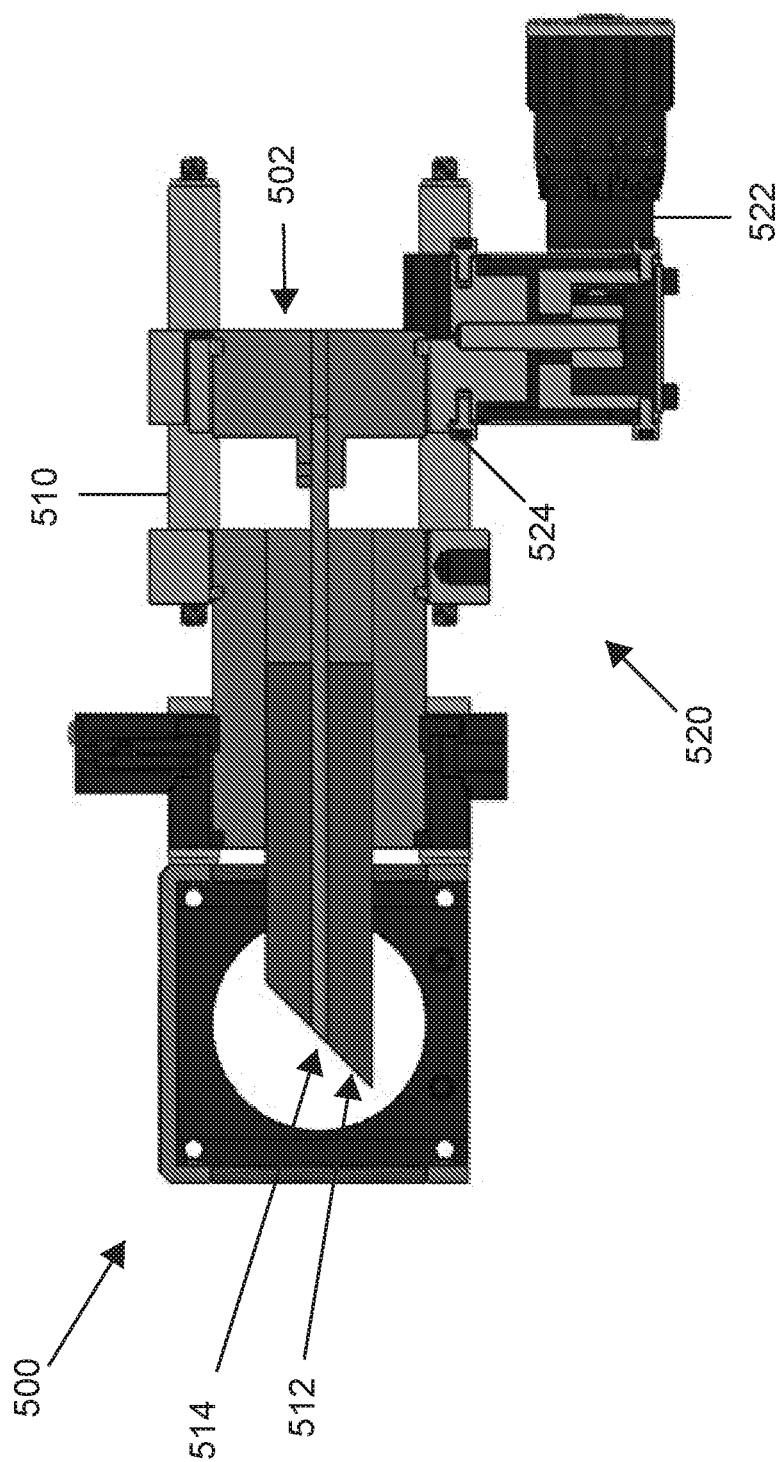
FIG. 14 shows a diagrammatic view of an opto-mechanical assembly incorporating a concentric mirror according to some embodiments of the invention.

FIG. 12 shows a diagrammatic view of the concentric mirror 500 which can be used to provide a combined amplitude mask and relative phase scan (e.g., phase mask). In accordance with some embodiments of the invention, the concentric mirror 500 can include a high reflectivity outer segment 512 and a lower reflectivity inner central segment 514 that is configured to move axially (e.g., by a displacement d2) with respect to the outer segment 512. A bearing or lubricated hole in the outer segment 512 can be provided to enable the inner central segment 514 to move easily with respect to the outer segment. A piezo actuator or driver 502 can be used to move the inner central segment 514 with respect to the outer segment 512 and a computer or microcontroller can be used to control the actuation of the piezo actuator or driver 502. In other embodiments, a stepping motor or linear actuator can be used in place of the piezo actuator 502 to move the inner central segment 514 with respect to the outer segment 512.

The concentric mirror 500 described above can fabricated by constructing a two-part co-axial assembly as shown in FIG. 6A (e.g., by obtaining an outer cylindrical part with a central hole extending along an axis and a second piece that can be inserted into the hole to be translated along the axis) and then performing an angled cutting operation as shown in FIG. 6B (e.g., cutting the assembly at 45 degrees). The angled surfaces can be subject to separate polishing processes to achieve the desired reflectivity of each component. For example, a high reflectivity polishing process can be used to polish the outer segment 512 with the center segment 514 retracted below the surface of the outer segment and the central segment 514 can be extended beyond the surface of the outer segment and polished using a low reflectivity polishing process. starting with a two-part co-axial assembly as shown in FIG. 6.

After the two-part concentric mirror assembly 500 is fabricated, the center shaft can be translated using commercially available opto-mechanical assemblies. FIG. 7 shows a design using cage assembly parts including a z-micrometer stage 520 (for axial translation of the center piece). The micrometer 522 is coupled between the frame 510 and the stage 524 such that the micrometer 522 can be used to obtain very precise movements of the stage 524 and the center segment 514 of the concentric mirror 500. In accordance with some embodiments of the invention, the translation stage can be automatically actuated by a variety of means including stepping motors and piezo drivers and computer or microcontroller based control systems.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. An interferometric reflectance imaging system for characterization of nanoparticles comprising:
   an illumination source configured to produce illumination light along an illumination path toward a target substrate;
   the target substrate configured to reflect the illuminating light producing a radiation pattern along a collection path toward an imaging sensor;
   wherein the collection path includes an amplitude or phase mask selected to adjust specularly reflected reference light for optimization of interferometric signal, and
   wherein the target substrate includes a base substrate having a first reflecting surface and a transparent spacer layer having a first surface in contact with the first reflecting surface and a second reflecting surface on a side opposite to the first surface, and
   wherein the transparent spacer layer has a predefined thickness that is determined as a function of a wavelength of the illuminating light and produces the predefined radiation pattern of optical scattering when nanoparticles are positioned on or near the second reflective surface.

2. An interferometric reflectance imaging system according to claim 1 wherein the illumination source includes at least one of a narrow-band light source, an LED light source, a monochromatic light source, a laser light source and a visible light source.

3. An interferometric reflectance imaging system according to claim 1 wherein the collection path includes a high numerical aperture objective lens.

4. An interferometric reflectance imaging system according to claim 1 wherein the illumination path includes an amplitude mask for structured illumination to improve resolution.

5. An interferometric reflectance imaging system according to claim 1 wherein the collection path includes an amplitude mask for apodization for the reflected light.

6. An interferometric reflectance imaging system according to claim 1 wherein the collection path includes a CCD or CMOS imaging sensor for detecting light along the collection path.

7. An interferometric reflectance imaging system according to claim 1 further comprising a filter having a predefined transmission profile wherein a central portion of the filter is configured to provide a first predefined transmissivity and an outer portion of the filter is configured to provide a second predefined transmissivity which is different than the first predefined transmissivity.

8. An interferometric reflectance imaging system according to claim 7 wherein the first predefined transmissivity of the central portion of the filter is less than the second predefined transmissivity of the outer portion of the filter.

9. An interferometric reflectance imaging system according to claim 7 further comprising an objective lens and wherein the collection path includes a 4f optical system with respect to the back focal plane of the objective lens and the filter is positioned along a conjugate plane.

10. An interferometric reflectance imaging system according to claim 1 further comprising a concentric mirror having a central portion configured to provide a first predefined reflectivity and an outer portion configured to provide a second predefined reflectivity which is different than the first predefined reflectivity.

11. An interferometric reflectance imaging system according to claim 10 wherein the first predefined reflectivity of the central portion of the concentric mirror is less than the second predefined reflectivity of the outer portion of the concentric mirror.

12. An interferometric reflectance imaging system according to claim 10 further comprising an objective lens and wherein the collection path includes a 4f optical system with respect to the back focal plane of the objective lens and the concentric mirror is positioned along a conjugate plane.

13. An interferometric reflectance imaging system according to claim 10 wherein the central portion of the concentric mirror is configured to move along the optic axis, enabling control over the phase of the reflected light.

14. A method for imaging nanoparticles comprising:
providing a target substrate having a target reflective surface wherein the target substrate includes a base substrate, the base substrate including a base reflective surface and a spacer layer mounted to the base reflective surface, the spacer layer having a predefined thickness providing a specific spatial confinement of scattered light and providing the target reflective surface;
illuminating the target reflective surface with illuminating light along an illumination path whereby reflected and scattered light from the target reflective surface and the base reflective surface is received along a collection path to one or more imaging sensors;
receiving by at least one imaging sensor the reflected and scattered light along the collection path from the target reflective surface and the base reflective surface, the reflected light and the scattered light creating an interference pattern in the imaging sensor plane;
where the collection path includes at least one amplitude or phase mask having a predefined numerical aperture configured to adjust the light along the collection path as a function of the wavelength of the reflected and scattered light and the predefined thickness of the spacer layer.

15. The method according to claim 14 wherein the collection path includes a high numerical aperture objective lens and wherein the reflected light received from the target substrate is received by the at least one imaging sensor and the scattered light from any nanoparticles at or near the reflective surface of the spacer layer are also received by the at least one imaging sensor.

16. The method according to claim 14 wherein the illuminating light includes an LED or a narrow-band light source.

17. The method according to claim 14 wherein the target substrate includes a $SiO_2$ spacer layer on top of a Si base substrate.

18. The method according to claim 14 wherein the at least one amplitude or phase mask in the collection path is circularly symmetric around the optical axis.

* * * * *